(12) United States Patent
Maciejewski et al.

(10) Patent No.: US 6,254,240 B1
(45) Date of Patent: Jul. 3, 2001

(54) EYECUP ASSEMBLY FOR A SUBMARINE PERISCOPE

(75) Inventors: Wendell C. Maciejewski, Wakefield; Riad Sayegh, West Kingston, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/656,195

(22) Filed: Sep. 6, 2000

(51) Int. Cl.[7] .............................. G02B 21/00; G02B 23/08
(52) U.S. Cl. .................... 359/611; 359/402; 359/405; 359/600
(58) Field of Search .................... 359/363, 399, 359/402, 404–409, 480–482, 503–513, 600–601, 608–614

(56) References Cited

U.S. PATENT DOCUMENTS

| | | | |
|---|---|---|---|
| 4,275,639 | * | 6/1981 | Garber ................................ 359/405 |
| 4,533,212 | * | 8/1985 | Shimizu ............................. 359/611 |
| 5,506,727 | * | 4/1996 | Douglas et al. ..................... 359/600 |

FOREIGN PATENT DOCUMENTS

| | | | |
|---|---|---|---|
| 20185 | * | 9/1899 | (CH) ................................... 359/600 |
| 48171 | * | 5/1966 | (DE) ................................... 359/600 |
| 132033 | * | 9/1919 | (GB) ................................... 359/600 |

* cited by examiner

*Primary Examiner*—Thong Nguyen
(74) *Attorney, Agent, or Firm*—Michael J. McGowan; Michael F. Oglo; Prithvi C. Lall

(57) ABSTRACT

An eyecup assembly for a submarine periscope blinder assembly includes an annularly-shaped ring having a multiplicity of holes, which are unthreaded, extending therethrough and adapted to receive screws for securing the eyecup assembly to a like multiplicity of holes which are threaded and arranged in a circular pattern around an eyepiece opening in the blinder assembly, the ring defining a central viewing opening. An eyecup lateral shell circumscribes the eyecup chamber and is fixed to the ring and configured to conform generally to an eye area of a viewer's head, and to be interchangeably mounted to the threaded holes to receive either the viewer's left or right eyes by selectively indexing the holes in the ring 180° apart relative to the threaded blinder assembly holes.

6 Claims, 3 Drawing Sheets

EYECUP ASSEMBLY FOR A SUBMARINE PERISCOPE

STATEMENT OF GOVERNMENT INTEREST

The invention described herein may be manufactured and used by and for the Government of the United States of America for Governmental purposes without the payment of any royalties thereon or therefor.

BACKGROUND OF THE INVENTION

(1) Field of the Invention

The invention relates to eyecups for viewing devices, such as periscopes, telescopes, mounted binoculars, eye examination devices, and the like, and is directed more particularly to an eyecup assembly of special utility in conjunction with blinder assemblies, which are part of submarine periscope systems.

(2) Description of the Prior Art

Eyecups for use on submarine periscope blinder assemblies traditionally have been provided with a circular rubber flange portion molded onto the rubber eyecup portion thereof. Submarine periscope systems include a "blinder assembly" which serves to prevent the passage of light to one eye of an operator, while permitting light to pass to the other eye through a clear glass or filter, such that the operator views a target with one eye. The blinder assembly has been provided with a groove into which the eyecup flange has been pressed. The groove receives the flange therein and the eyecup is held thereby on the blinder assembly.

Eventually, however, the flange tends to stretch out and become larger than the groove, at which point the flange-in-groove interconnection is no longer effective and the eyecup becomes loose and eventually drops from the blinder assembly.

To solve the problem, mechanical clamps have been used to hold the rubber flange of the eyecup in the groove on the blinder assembly. Such clamps have been effective to varying degrees, depending in large measure on the ingenuity and handiness of the one devising and installing the clamp.

It is also desirable that the eyecup assembly be conformable to the areas of a viewer's face surrounding either one or the other of the viewer's right and left eyes.

Accordingly, there is a need for an eyecup assembly which is adapted for secure attachment to a submarine periscope blinder assembly, which does not fall from the periscope or require make-shift measures to be retained on the blinder assembly and which can be interchangeably mounted to selectively be conformable to either one or the other of the area of the viewer's face surrounding the right eye or the area of the face surrounding the left eye.

SUMMARY OF THE INVENTION

An object of the invention is, therefore, to provide an eyecup assembly for a submarine periscope blinder assembly, which eyecup assembly is adapted for consistently secure attachment to the blinder assembly and which can be interchangeably mounted to the blinder assembly in such a way that it is selectively conformable to either of the areas of the viewer's face surrounding the right and left eye.

With the above and other objects in view, as will hereinafter appear, a feature of the invention is the provision of an eyecup assembly for a submarine periscope blinder assembly. The eyecup assembly comprises an annularly-shaped ring having a multiplicity of holes, which are unthreaded, extending therethrough and adapted to receive screws for securing the eye cup assembly to a like multiplicity of holes which are threaded and arranged in a ring pattern around an eyepiece opening in the blinder assembly, the annularly-shaped ring defining a central viewing opening. The eyecup assembly further comprises an eyecup lateral shell member circumscribing the eyecup chamber and which is fixed to the ring and configured to conform generally to an eye area of a viewer's head, more particularly, the eyecup lateral shell member is composed of one portion which is generally configured to conform to a portion of the facial area of a viewer's eye including the temple and upper cheek, and another portion generally configured to conform to a portion of the facial area including the central forehead and upper nose, with each of the one and another portions bilaterally symmetrical about a horizontal axis of symmetry through the threaded holes. This arrangement enables the eyecup assembly to be interchangeably mounted in a way accommodating either the viewer's right or left eye. Depending on whether the eyecup assembly's central viewing opening is to be in condition permitting light to pass to the eye, or in a condition preventing passage of light to the eye, a rigid annulus, or a rigid opaque plate, respectively, overlies the annularly-shaped ring and has a like multiplicity and pattern of unthreaded holes, such that heads of the screws for securing the eyecup assembly to the blinder assembly engage the rigid annulus or rigid circular plate. The lateral shell member is provided with vent holes.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, and wherein corresponding reference characters indicate corresponding parts throughout the several views of the drawings and wherein.

DESCRIPTION OF THE PREFERRED EMBODIMENTS

Figure 1:
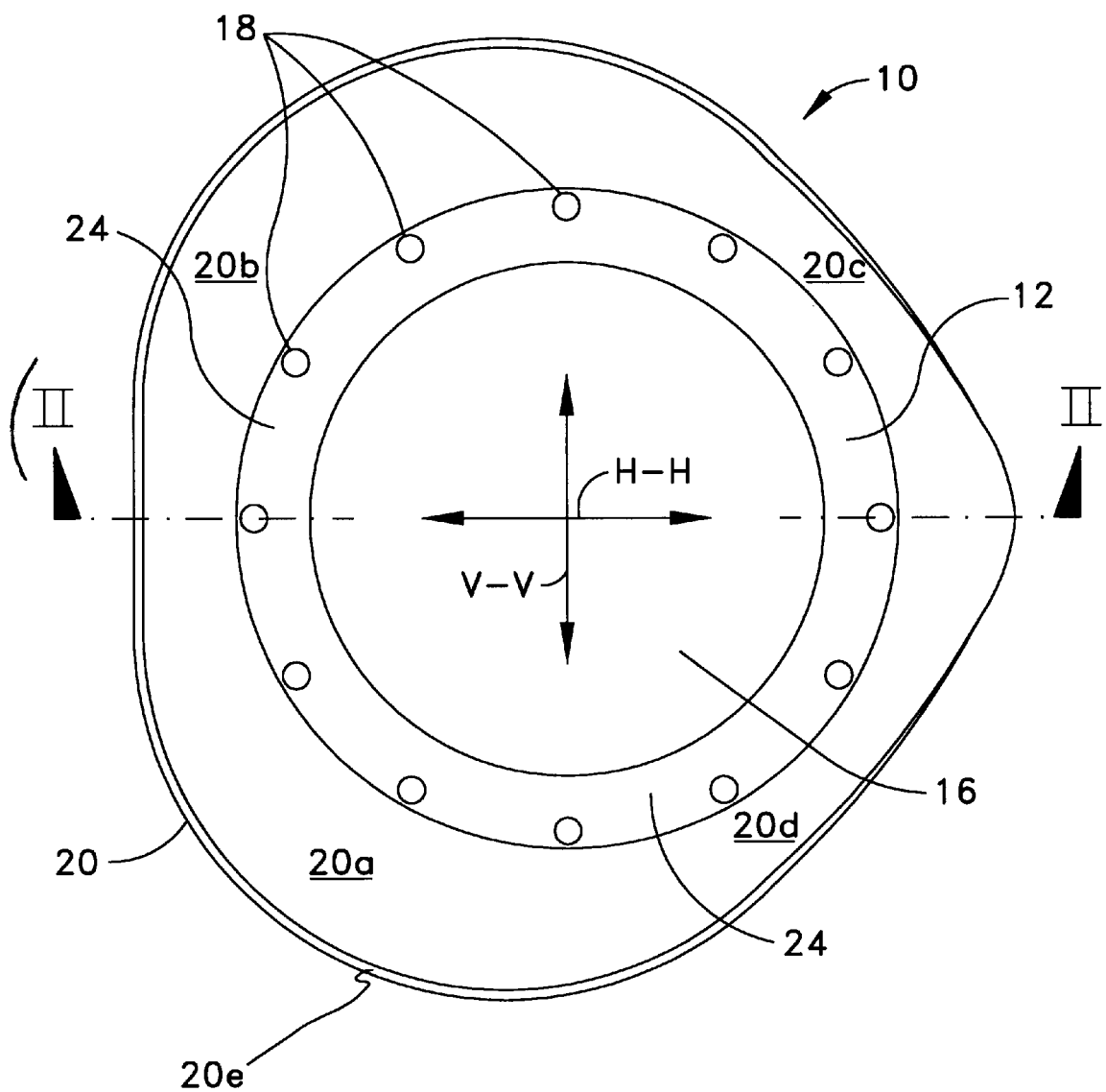
FIG. 1 is a front elevational view of one form of an eyecup assembly illustrative of a preferred embodiment of the invention.
Figure 2:
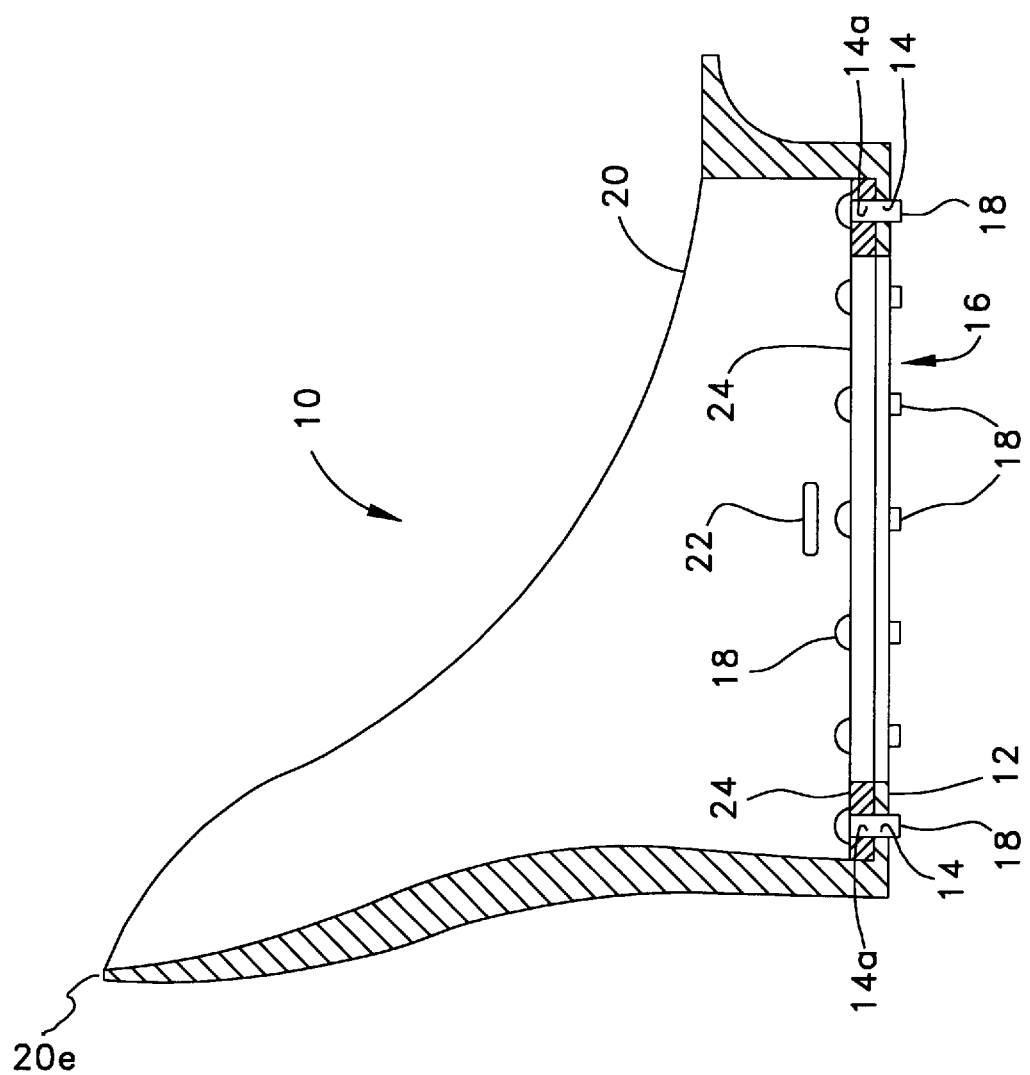
FIG. 2 is a sectional view taken along line II—II of FIG. 1.

Referring to FIGS. 1 and 2, it will be seen that an illustrative embodiment of eyecup assembly 10 includes an annularly-shaped ring 12 having a multiplicity of unthreaded holes 14 (twelve shown in FIG. 1) extending therethrough and adapted to receive screws 18 for securing the eyecup assembly to a blinder assembly portion (not shown) of a submarine periscope (not shown). The ring 12 defines a central viewing opening 16.

A flexible eyecup lateral shell member 20 is fixed to ring 12 and is configured to laterally circumscribe an eyecup chamber and at its outer end to conform generally to an eye area of a viewer's head. Referring to FIG. 1 for a more particular description of how the configuration of shell member 20 conforms to the area of a viewer's face in a way adaptable for either eye, the unthreaded holes 14 in annularly-shaped ring 12 are arranged in a pattern symmetrical relative to horizontal and vertical reference axes H-H and V-V in the plane of ring 12. Lateral shell member is composed of four sectors 20a, 20b, 20c, and 20d, respectively extending from the four quadrants of ring 12 defined by the axes H-H and V-V. The portion of the shell member consisting of sectors 2Øa and 2Øb, which as cup assembly 10 appears of FIG. 1 is to the left of vertical axis V-V, is configured to generally conform to a portion of the viewer's facial area surrounding an eye including the upper cheek and temple. This portion (sectors 20a and 20b) is bilaterally symmetrical about axis H-H. That is to say, sectors 20a and 20b are of identical predetermined shapes which generally conform to either the temple or the upper cheek areas of a face, but are in a mirror image relationship to one another about axis H-H. The portion of the shell member on the other side (right side as eyecup assembly 10 appears in FIG. 1) of axis V-V consists of sectors 20C and 20d. This portion is likewise bilaterally symmetrical about horizontal axis H-H, with sectors 20c and 20d of identical predetermined shapes which generally conform to either the central forehead or upper nose areas of a face, but are in a mirror image relationship about axis H-H. In accordance with the present invention, this configuration of shell member 20 enables eyecup assembly 10 to be interchangeably attached to a like aligned ring of threaded holes around an eyepiece opening on the blinder to selectively receive either one of the viewer's right and left eyes, by indexing the ring of holes 14 in the annularly shaped ring 12 at positions 180° apart. The shell member 20 is provided with a plurality of vent holes 22. The vent holes 22 prevent a vacuum from developing when the operator presses against flexible cup 20.

FIG. 2 depicts an embodiment of eyecup assembly 10 which permits light to pass from the eyepiece opening of the periscope blinder assembly (not shown) to the viewer's eye. As will become apparent as the description progresses, in this preferred embodiment annularly-shaped ring 12 is flexible.

A rigid annulus 24 overlies ring 12 and is provided with unthreaded holes 14a aligned with the ring holes 14, such that heads of screws 18 received by holes 14 engage rigid annulus 24 and not the flexible ring 12.

The ring 12 and lateral shell member 20 are preferably formed as a unitary molded body, as shown in the drawings. In one preferred embodiment, the material out of which a combined ring 12 and lateral shell member 20 is molded is a neoprene formulation which exhibits a hardness in the range of 50 to 80 of the Shore scale of Durometer measurement. The invention may also be practiced by molding shell member 20 using any of other known elastomeric materials exhibiting like durability and hardness characteristics.

In fabrication of the periscope blinder assembly, ring 12 is secured to the blinder assembly by twelve screws 18, the screw heads bearing against the rigid annulus 24 which, in turn, presses ring 12 against the surface of the blinder assembly to which the eye cup assembly is attached.

Figure 3:
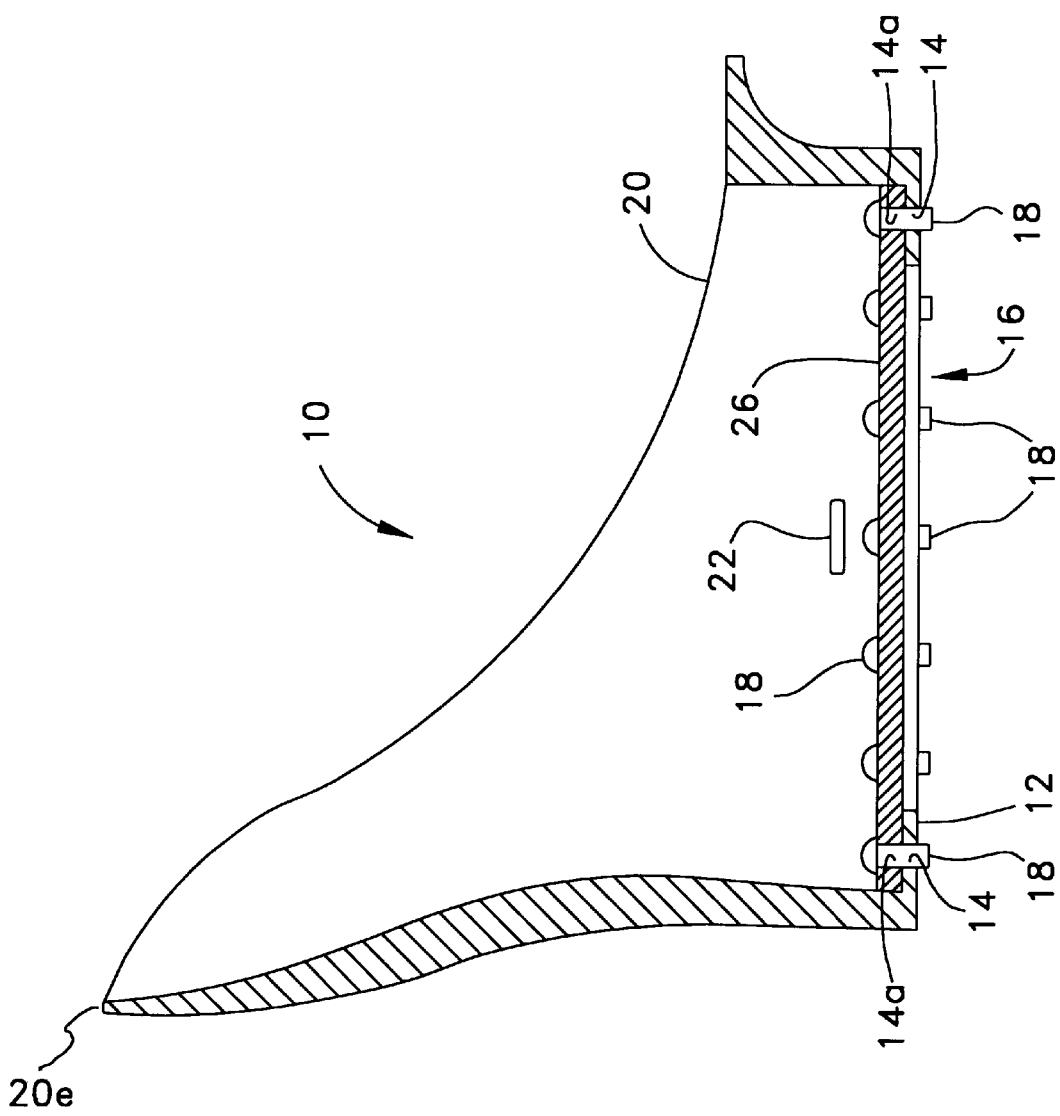
FIG. 3 is similar to FIG. 2, but illustrative of an alternative embodiment.

In use of eyecup assembly 10 in connection with a periscope blinder assembly, a viewer presses each eye into the outer end shell edge 20e of the lateral shell member 20 of the respective eyecup assembly 10. An eyecup assembly in accordance with the invention is suitable for either a left or right eye and for either a blind or viewing opening 16. Referring to FIG. 3, it will be seen that when used as a blind eyecup assembly 10' to prevent passage of light from the eyepiece opening of the blinders assembly to the viewer's eye, the opening 16 is closed off by a rigid opaque plate, or "blank" 26.

There is thus provided an eyecup assembly adapted for secure attachment to a submarine periscope blinder assembly.

It will be understood that many additional changes in the details, materials, and arrangement of parts, which have been herein described and illustrated in order to explain the nature of the invention, may be made by those skilled in the art within the principles and scope of the invention as expressed in the appended claims. For example, while the above description has focused on use of the eyecup assembly in conjunction with a submarine periscope, and while the invention is believed to find substantial utility in such combination, it will be apparent that the invention is readily adaptable to usage in other similar environments, such as in telescopes, mounted binoculars, eye examination machines, and the like.

What is claimed is:

1. An eyecup assembly for attachment to an optical apparatus, said eyecup assembly comprising:

an annularly-shaped ring having a multiplicity of unthreaded holes extending therethrough and adapted to receive screws for securing said eyecup assembly to the optical apparatus by engaging threaded holes in the optical apparatus;

a rigid annulus overlying said ring and having a multiplicity of unthreaded holes therein aligned with the annularly-shaped ring multiplicity of holes, such that heads of the screws received by the multiplicities of holes engage the rigid annulus; and a flexible eyecup shell member laterally circumscribing an eyecup chamber, an inner end of said eyecup shell member forming a circular shell edge fixed to a periphery of said annularly-shaped ring, and an outer end of said eyecup shell member forming a shell edge conformable to a facial area surrounding an eye of a viewer, the shell member being provided with a plurality of vent holes.

2. The eyecup assembly in accordance with claim 1 wherein:

said eyecup shell member comprises one portion to one side of a vertical axis in a plane of said annularly-shaped ring and another portion to another side of said vertical axis, said one portion being generally configured to cover a portion of the facial area including temple and upper cheek, said another portion being generally configured to cover a portion of the facial area including central forehead and upper nose, said one and the other portions each being bilaterally symmetrical about a horizontal axis;

whereby said eyecup assembly is adapted to receive either of the viewer's eyes.

3. The eyecup assembly in accordance with claim 1 wherein said annularly-shaped ring and said eyecup lateral shell member are formed as a single unitary molded body.

4. The eyecup assembly in accordance with claim 3 wherein said unitary molded body is of an elastomeric material.

5. The eyecup assembly in accordance with claim 4 wherein the elastomeric material comprises a formulation of neoprene which exhibits a hardness in the range of 50–80 on a Shore A scale of durometer measurement.

6. An eyecup assembly for attachment to an optical apparatus, said eyecup assembly comprising:

an annularly-shaped ring having a multiplicity of unthreaded holes extending therethrough and adapted to receive screws for securing said eyecup assembly to the optical apparatus by engaging threaded holes in the optical apparatus;

an opaque rigid plate overlying said ring and having a multiplicity of unthreaded holes therein aligned with the annularly-shaped ring multiplicity of holes, such that heads of screws recieved by the multiplicities of holes engage the plate, to thereby adapt said eyecup assembly to prevent passage of light to the viewer's eye; and a flexible eyecup shell member laterally circumscribing an eyecup chamber, and inner end of said eyecup shell member forming a circular shell edge fixed to a periphery of said annularly-shaped ring, and an outer end of said eyecup shell member forming a shell edge conformable to a facial area surronding an eye of a viewer, the shell member being provided with a plurality of vent holes.

* * * * *